(12) United States Patent
Zhang

(10) Patent No.: US 6,823,465 B2
(45) Date of Patent: Nov. 23, 2004

(54) ESTABLISHMENT OF VOLTAGE OF A TERMINAL AT A VOLTAGE LEVEL IN RESPONSE TO VALIDATING THE INDICATION OF THE VOLTAGE TO BE SUPPLIED TO THE TERMINAL

(75) Inventor: Michael T. Zhang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 639 days.

(21) Appl. No.: 09/846,085

(22) Filed: Apr. 30, 2001

(65) Prior Publication Data
US 2002/0162040 A1 Oct. 31, 2002

(51) Int. Cl.⁷ .............................................. G06F 1/26
(52) U.S. Cl. ..................................................... 713/300

(58) Field of Search ................................. 713/300, 340; 307/52

(56) References Cited

U.S. PATENT DOCUMENTS 6,327,663 B2 * 12/2001 Isaac et al. .................. 713/300
6,448,672 B1 * 9/2002 Voegeli et al. ................ 307/52
6,748,545 B1 * 6/2004 Helms .......................... 713/300

* cited by examiner

Primary Examiner—Thomas Lee
Assistant Examiner—P Chandrasekhar
(74) Attorney, Agent, or Firm—Trop, Pruner & Hu, P.C.

(57) ABSTRACT

An electronic device includes an external supply voltage terminal and a circuit. The circuit provides an indication of a first supply voltage level to be furnished to the supply voltage terminal in response to receiving power from the terminal.

18 Claims, 5 Drawing Sheets

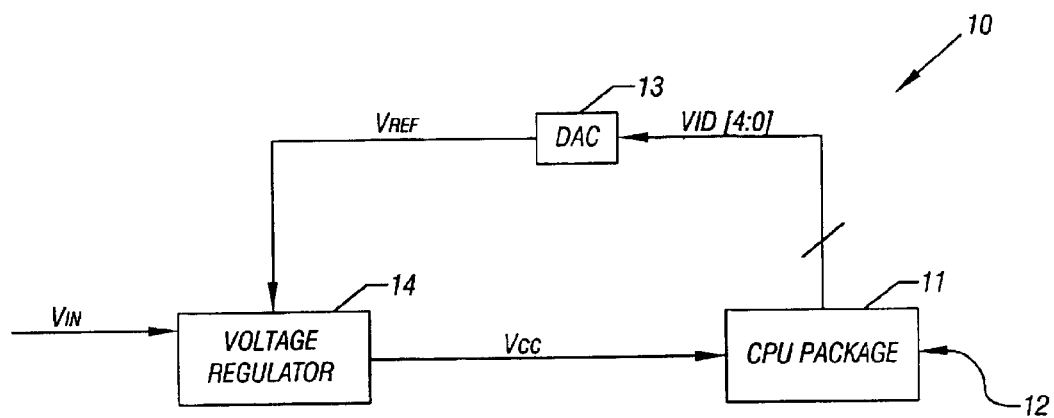
**FIG. 1
(PRIOR ART)**
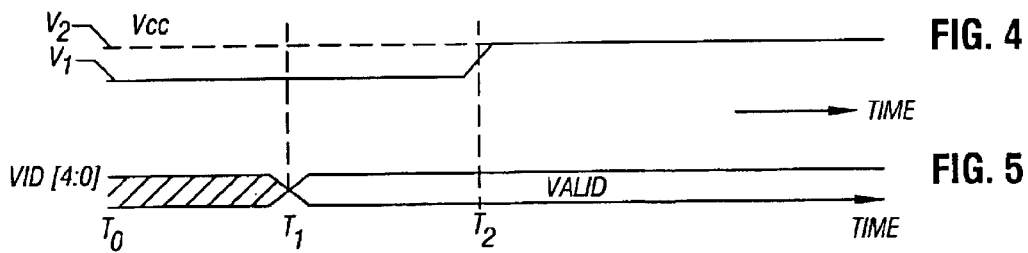
FIG. 4
FIG. 5

ESTABLISHMENT OF VOLTAGE OF A TERMINAL AT A VOLTAGE LEVEL IN RESPONSE TO VALIDATING THE INDICATION OF THE VOLTAGE TO BE SUPPLIED TO THE TERMINAL

BACKGROUND

The invention generally relates to supply voltage identification.

A typical computer system includes a power supply that provides and regulates various supply voltages that are used by the components of the computer system. As examples, the computer system may provide and regulate supply voltages for 5 volt (V), 3.3 V, 2.5 V, 1.8 V and 1.5V supply lines, or power planes, of the computer system.

One component that receives supply voltages from the voltage planes of the system is a central processing unit (CPU) device. In this manner, the CPU device may be encoded with a voltage identification (VID) number, a digital number that identifies a specific supply voltage to be furnished to the core circuitry of the CPU device. To derive the VID number for a particular CPU device, the device is tested to determine an optimal supply voltage for its core circuitry. Based on this determined optimal supply voltage, the VID number may be encoded into the CPU device.

One way to encode the VID number involves configuring the packaging of the CPU device so that external terminals of the device indicate the VID number. For example, the CPU device may be packaged in a ball grid array package, a package that houses the die that contains the core circuitry of the CPU device and includes specific external solder terminals, or bumps, that indicate the VID number. A conventional technique to encode a particular VID number into the CPU device is to selectively connect the VID-associated external solder bumps together inside the package in a specific configuration to indicate the VID number. Therefore, due to this technique, each different VID number requires a different package configuration.

As an example, FIG. 1 depicts a system 10 that includes a CPU device 12 that is encoded with a VID number using the technique that is described above. At power up of the system 10, the CPU device 12 furnishes a digital signal (called VID[4:0]) that indicates its VID number to a digital-to-analog converter (DAC) 13. In response to the VID number, the DAC 13 furnishes an analog reference voltage (called $V_{REF}$) that forms an analog indication of the VID number. A voltage regulator 14 receives the $V_{REF}$ voltage and in response generates a supply voltage (called $V_{CC}$) for the CPU device 12 that is near the supply voltage level that is indicated by the VID number.

BRIEF DESCRIPTION OF THE DRAWING

FIG. 1 is a schematic diagram of voltage identification circuitry of a processor-based system of the prior art.

FIGS. 4 and 5 are waveforms of signals of the system of FIG. 3 according to an embodiment of the invention.

DETAILED DESCRIPTION

Figure 2:
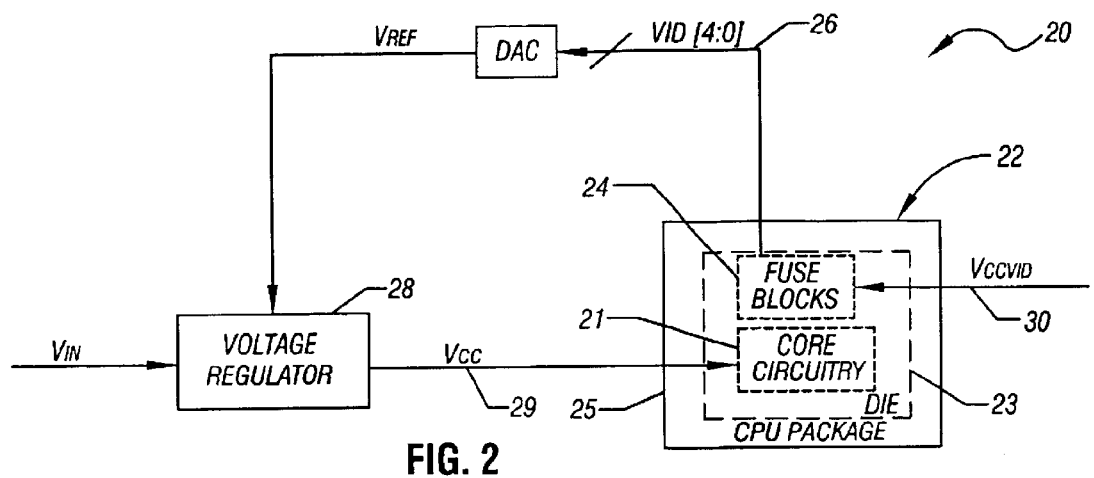
FIG. 2 is a schematic diagram of alternative voltage identification circuitry of a processor-based system.

For purposes of eliminating the use of different package configurations to implement different voltage identification (VID) numbers, a voltage identification system 20 that is depicted in FIG. 2 may be used. In this system 20, a central processing unit (CPU) device 22 does not have its VID number encoded into its package 25. Instead, the CPU device 22 includes fuse blocks 24 that are fabricated on a die 23 of the CPU device 22 and are used to indicate the VID number.

Thus, different package configurations are not used for different VID numbers. Instead, the same package configuration may be used for all CPU devices, as the VID number is programmed into the die 23 via the fuse blocks 24. The fuse blocks 24 may be permanently set to indicate the VID number (via laser cutting specific fuses of the fuse blocks 24) or may alternatively be programmable so that the VID number may be dynamically changed by the circuitry of the CPU device 22 to reflect changes in operating conditions, temperature, etc.

This VID number is readable from specific VID external contacts (solder balls, for example) of the CPU device 24 via a digital signal (a five bit digital signal called VID[4:0], for example) that indicates its VID number. The VID[4:0] signal is communicated (via wires 26) to a digital-to-analog converter (DAC) 27 of the system 20. In response to the VID number, the DAC 27 furnishes an analog reference voltage (called $V_{REF}$) that forms an analog indication of the VID number. A voltage regulator 28 receives the $V_{REF}$ voltage and generates a supply voltage (called $V_{CC}$) that is communicated to a supply voltage terminal 29 of the CPU device 22. This supply voltage terminal 29 provides power to core circuitry 21 (arithmetic logic unit, an internal cache, an instruction unit, etc.) of the CPU device 22. The $V_{CC}$ supply voltage is near the supply voltage level that is indicated by the VID number.

At power up of the system 20, the VID[4:0] signal is communicated by the CPU device 12 before the voltage regulator 28 sets the $V_{CC}$ voltage to the appropriate level that is indicated by the VID[4:0] signal. For purposes of permitting the CPU device 12 to communicate the VID[4:0] signal before the voltage regulator 28 furnishes the $V_{CC}$ voltage, a separate supply voltage (called $V_{CCVID}$) is provided to a supply voltage terminal 30 of the CPU device 22 and is used to power the fuse blocks 24. In this manner, in response to receiving the $V_{CCVID}$ supply voltage, the fuse blocks 24 provide the VID[4:0] signal. However, because a separate supply voltage is furnished to the fuse blocks 24, such an approach may add to the complexity, pin count and cost of the CPU device 22.

Figure 3:
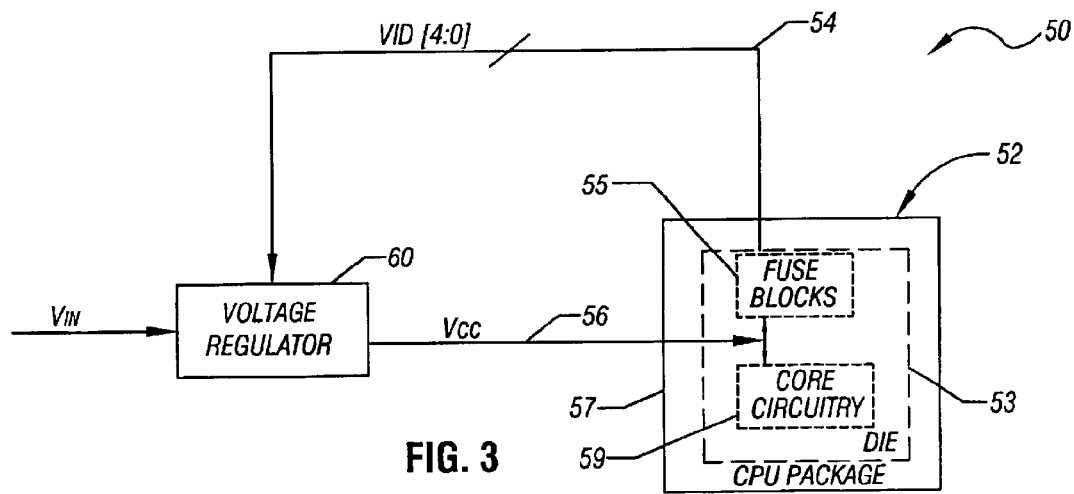
FIG. 3 is a schematic diagram of voltage identification circuitry of a processor-based system according to an embodiment of the invention.

Therefore, referring to FIG. 3, an embodiment 50 of a voltage identification system in accordance with the invention includes a CPU device 52 and voltage regulator 60 that are designed to eliminate the use of the $V_{CCVID}$ supply voltage. More specifically, the CPU device 52 includes a die 53 that is packaged inside a package 57 of the device 52. Fuse blocks 55 are fabricated on the die and are used to form an indication of the VID number of the CPU device 52. The fuse blocks 55 may be permanently programmed (via a laser, for example) after fabrication of the die 53 or may be programmable to be dynamically readjusted by the CPU device 52 so that the CPU device 52 may change its VID to adjust to different operation conditions.

Unlike the fuse blocks 24 of the CPU device 22, the fuse blocks 55 are connected to receive power from a supply voltage input terminal 56 (of the CPU device 22) that also furnishes power to core circuitry 59 of the CPU device 52. Thus, the fuse blocks 55 do not receive power from a separate voltage supply line, but instead, the fuse blocks 55 receive power from the same supply voltage input terminal 56 that is used to furnish power to the core circuitry 59.

To accomplish this, the voltage regulator 60 furnishes two different voltage levels (via the $V_{CC}$ voltage) to the supply voltage input terminal 56: before the fuse blocks 55 furnish a valid VID[4:0] signal, the voltage regulator 60 sets the $V_{CC}$ voltage to a relatively constant voltage level (called $V_1$) that is not a function of the VID[4:0] signal, and after the fuse blocks 55 furnish a valid VID[4:0] signal, the voltage regulator 60 sets the level of the $V_{CC}$ voltage to a voltage level (called $V_2$) that is indicated by the VID number.

More particularly, FIGS. 4 and 5 depict exemplary waveforms of the $V_{CC}$ supply voltage and the VID[4:0] signal during the power up of the system 50. At time $T_0$ shortly after power up, the voltage regulator 60 sets the level of the $V_{CC}$ voltage to the predetermined $V_1$ voltage level, as the VID[4:0] signals are not valid. At time $T_1$, the VID signals become valid in response to the fuse blocks 55 receiving the $V_1$ voltage level. The $V_{CC}$ supply voltage remains at the $V_1$ voltage level until time $T_2$, a time at which the voltage regulator 60 responds to the VID [4:0] signal becoming valid and begins regulating the level of the $V_{CC}$ voltage in response to the VID[4:0] signal to the level indicated by the VID[4:0] signal.

Although the $V_2$ voltage level is depicted in FIGS. 4 and 5 as being greater than the $V_1$ voltage level, the $V_2$ voltage level may be less than the $V_1$ voltage level in some embodiments of the invention.

Thus, the system 50 provides the advantage of having the VID indication generated on the die 53 without the use of a second voltage source for the fuse blocks 55. This decreases cost, simplifies packaging, simplifies platform and package routing, increases the flexibility of the CPU device configuration and permits a lower cost approach to implement a dynamic VID-based CPU device 52.

Figure 6:
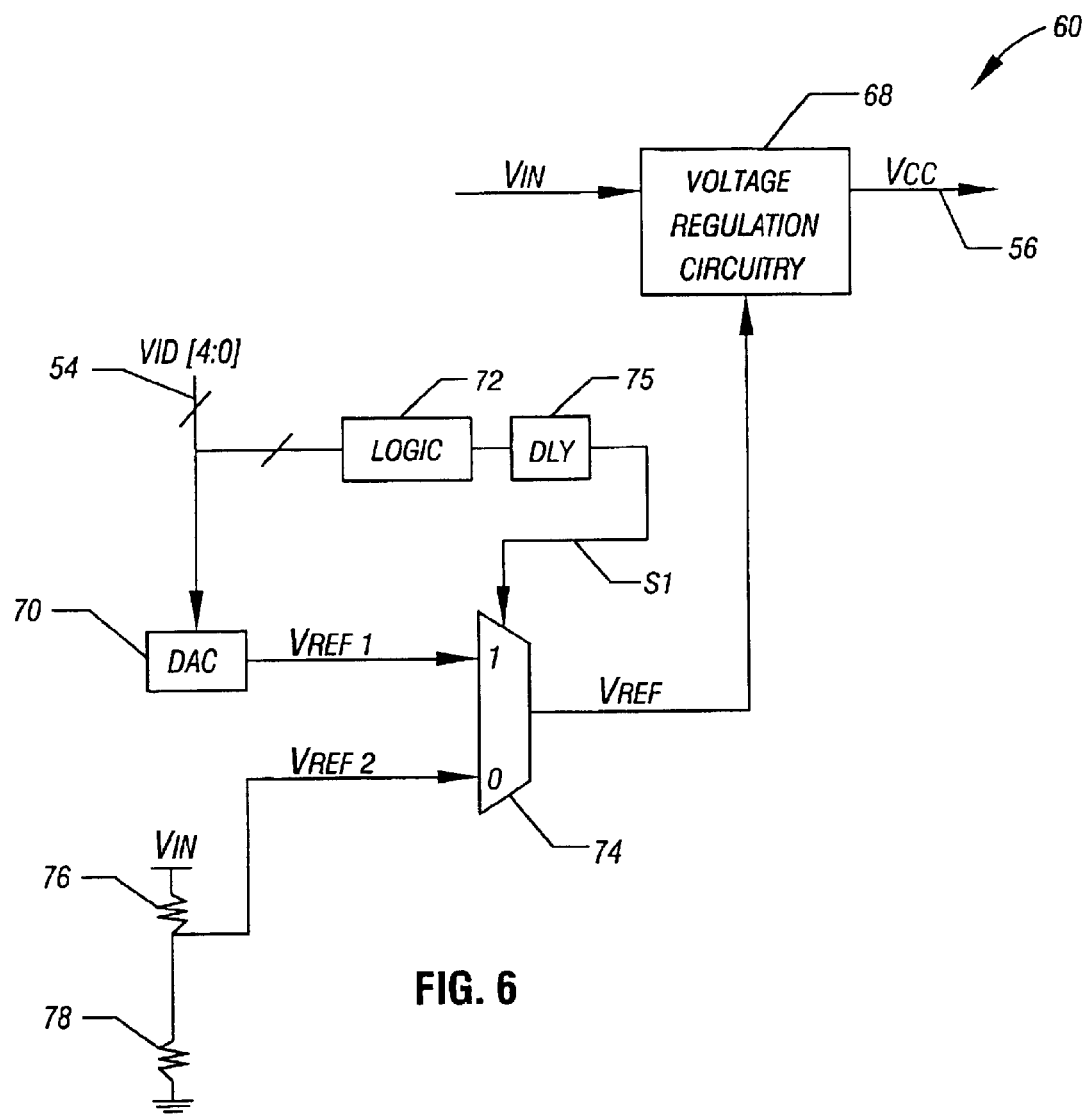
FIGS. 6 and 7 are schematic diagrams of a voltage regulator of the system of FIG. 3 according to different embodiments of the invention.

The voltage regulator 60 may have many different designs, one of which is depicted in FIG. 6. As shown, the voltage regulator 60 includes voltage regulation circuitry 68 that converts an input voltage (called $V_{IN}$) into the $V_{CC}$ voltage. The level at which the voltage regulation circuitry 68 regulates the $V_{CC}$ voltage is controlled by a reference voltage called $V_{REF}$. As an example, the voltage regulation circuitry 68 may set the level of the $V_{CC}$ voltage to be proportional to the $V_{REF}$ voltage.

The voltage regulation circuitry 68 may use linear or switching-type control to regulate the $V_{CC}$ voltage. Thus, as an example, the voltage regulation circuitry 68 may include components that form a Buck, Boost or flyback topology (as just a few examples), for embodiments where the voltage regulation circuitry 68 uses a switching-type control.

As noted above, the $V_{REF}$ reference voltage controls the level of the $V_{CC}$ voltage. In some embodiments of the invention, the $V_{REF}$ voltage is furnished by the output terminal of a multiplexer 74. The multiplexer 74 selects a relatively constant reference voltage (called $V_{REF2}$) to establish the $V_{REF}$ voltage to set the $V_{CC}$ voltage level near the $V_1$ voltage level (see FIG. 4), and the multiplexer 74 selects a voltage (called $V_{REF1}$) to set the $V_{CC}$ voltage level near the $V_2$ voltage level (see FIG. 4), a voltage level that is controlled by the VID number of the CPU package 52. Thus, an input terminal of the multiplexer 74 receives the $V_{REF2}$ voltage, and another input terminal of the multiplexer 74 receives the $V_{REF1}$ voltage.

As an example, the $V_{REF2}$ voltage may be furnished by a resistive voltage divider that is formed from resistors 76 and 78 that set the $V_{REF2}$ voltage proportional to the $V_{IN}$ voltage. Other arrangements may be used to generate the $V_{REF2}$ voltage. The $V_{REF1}$ voltage is furnished by the output terminal of a digital-to-analog converter (DAC) 70 that furnishes the $V_{REF1}$ voltage in response to the VID[4:0] signal. Thus, the level of the $V_{REF1}$ voltage is set by the VID[4:0] signal.

A select signal (called S1) is received by the selection control terminal of the multiplexer 74 and controls whether the voltage level of the $V_{REF}$ voltage is set to the $V_{REF1}$ or $V_{REF2}$ voltage level. During the power up of the system 50 before the VID[4:0] signal becomes valid, the S1 signal is deasserted (driven low, for example) to cause the multiplexer 74 to select the $V_{REF2}$ voltage and thus, set the level of the $V_{CC}$ voltage near the level of the $V_{REF2}$ voltage. When the VID[4:0] signal is valid, the S1 signal is asserted (driven high, for example) to cause the multiplexer 74 to select the $V_{REF1}$ voltage and thus, cause the level of the $V_{CC}$ voltage to be a function of the VID[4:0] signal.

In some embodiments of the invention, to determine whether the VID[4:0] signal is valid, the voltage regulator 60 includes logic 72 that compares the bits that are indicated by the VID[4:0] signal to an initialized bit value ("11111b," for example, where the "b" suffix indicates a binary representation) that is indicated by the fuse blocks 55 before the fuse blocks 55 furnish a valid VID[4:0] signal. In this manner, the logic 72 asserts (drives high, for example) the signal at its output terminal when the VID[4:0] signal no longer indicates an initialized bit value and deasserts (drives low, for example) the signal at its output terminal otherwise. A delay element 75 that provides the S1 signal may be coupled to the output terminal of the logic 75 to delay the signal that is provided the output terminal of the logic 72.

Figure 7:
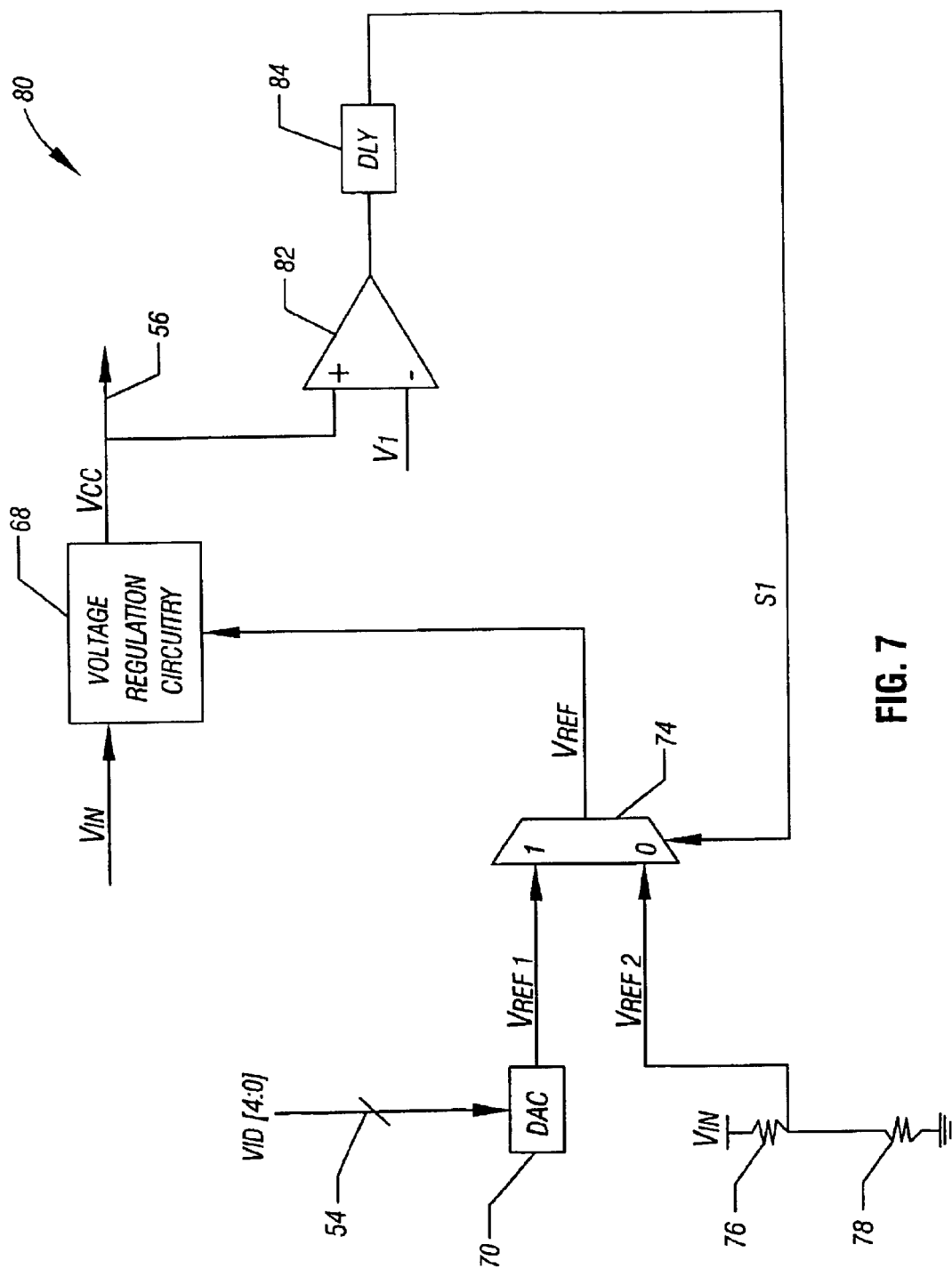

FIG. 7 depicts another voltage regulator 80 that may be used in place of the voltage regulator 60, in some embodiments of the invention. The voltage regulator 80 has a similar design to the voltage regulator 60 except for the differences noted below. In particular, the voltage regulator 80 generates the S1 signal in a different manner by comparing (via a comparator 82) the level of the $V_{CC}$ voltage to the $V_1$ voltage level. A delay element 84 is coupled to the output terminal of the comparator 82 to generate the S1 signal at an output terminal of the delay element 84. Thus, due to this arrangement, during an interval that begins at initial power up and extends for a delay subinterval after the $V_{CC}$ voltage reaches the $V_1$ voltage level, the S1 signal is deasserted (driven low, for example) to set the $V_{CC}$ voltage equal to the $V_1$ voltage level. After permitting the $V_{CC}$ voltage to achieve this voltage level for a predetermined amount of time, the S1 signal is asserted (driven high, for example) to set the $V_{CC}$ voltage equal to the $V_2$ voltage level, a level that is controlled by the VID number of the CPU device 52.

Figure 8:
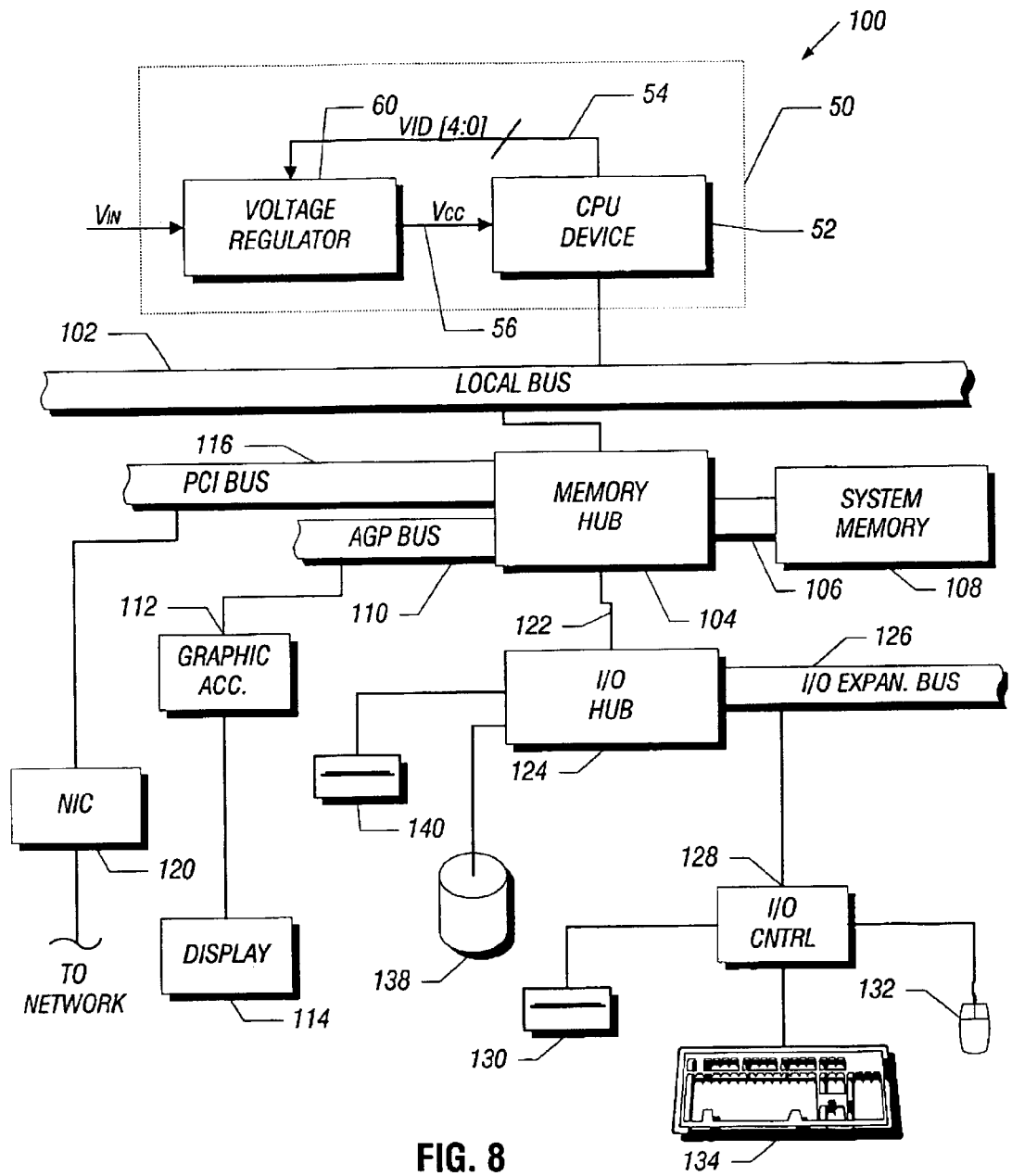
FIG. 8 is a schematic diagram of a computer system according to an embodiment of the invention.

Referring to FIG. 8, in some embodiments of the invention, the system 50 maybe part of a computer system 100. In this system 100, the CPU device 52 may be coupled to a local bus 102 along with a north bridge, or memory hub 104. The memory hub 104 may represent a collection of semiconductor devices, or a "chip set," and provide interfaces to a Peripheral Component Interconnect (PCI) bus 116 and an Accelerated Graphics Port (AGP) bus 110. The PCI Specification is available from The PCI Special Interest Group, Portland, Oreg. 97214. The AGP is described in detail in the Accelerated Graphics Port Interface Specification, Revision 1.0, published on Jul. 31, 1996, by Intel Corporation of Santa Clara, Calif.

A graphics accelerator 112 may be coupled to the AGP bus 110 and provide signals to drive a display 114. The PCI bus 116 may be coupled to a network interface card (NIC) 120, for example. The memory hub 104 may also provide an interface to a memory bus 106 that is coupled to a system memory 108.

A south bridge, or input/output (I/O) hub 124, may be coupled to the memory hub 104 via a hub link 122. The I/O hub 124 represents a collection of semiconductor devices, or a chip set, and provides interfaces for a hard disk drive 138, a CD-ROM drive 140 and an I/O expansion bus 126, as just a few examples. An I/O controller 128 may be coupled to the I/O expansion bus 126 to receive input data from a mouse 132 and a keyboard 134. The I/O controller 128 may also control operations of a floppy disk drive 130.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method comprising:
    providing an indication of a first supply voltage level to be furnished to a supply voltage terminal in response to receiving power from the terminal;
    validating the indication; and
    in response to the validation of the indication, establishing a voltage of the terminal substantially at the first supply voltage level.

2. The method of claim 1, wherein the providing comprises:
    providing the indication in response to a second supply voltage level being furnished to the terminal, the second supply voltage level being independent from the indication.

3. The method of claim 2, wherein the second supply voltage level comprises a relatively constant supply voltage level.

4. The method of claim 1, where the indication is associated with a first circuit, the method further comprising:
    furnishing the first voltage supply level from the terminal to another circuit separate from the first circuit.

5. The method of claim 1, wherein the electronic device comprises a central processing unit device.

6. The method of claim 1, wherein the indication represents a voltage identification number.

7. The method of claim 1, wherein the validating comprises:
    determining whether the indication indicates an initialization value for the indication not indicative of the first supply voltage level.

8. A system comprising:
    an electronic device including an external supply voltage terminal, the electronic device providing an indication of a first supply voltage level to be furnished to the terminal in response to receiving power from the terminal; and
    a voltage regulator to provide power to the electronic device through the terminal to cause the electronic device to provide the indication and regulate a voltage of the terminal substantially at the first supply voltage level in response to validation of the indication.

9. The system of claim 8, wherein the voltage regulator regulates the voltage of the terminal substantially at a second voltage level independent from the first voltage level to cause the electronic device to provide the indication.

10. The system of claim 8, wherein the second supply voltage level comprises a relatively constant supply voltage level.

11. The system of claim 8, wherein the electronic device comprises a central processing unit device.

12. The system of claim 8, wherein the indication represents a voltage identification number.

13. The system of claim 8, wherein the voltage regulator validates the indication by comparing the indication to an initialization value for the indication.

14. A voltage regulator comprising:
    voltage regulation circuitry to provide an output voltage in response to a reference voltage to power an electronic device; and
    a circuit to set the reference voltage to a first level to cause the voltage regulation circuitry to regulate the output voltage substantially at a predetermined output voltage level, validate an indication of a supply voltage level furnished by the electronic device, and in response to the validation, set the reference voltage substantially at a second supply voltage level to cause the voltage regulation circuitry to regulate the output voltage substantially at the supply voltage level indicated by the electronic device.

15. The voltage regulator of claim 14, wherein the second supply voltage level comprises a relatively constant supply voltage level.

16. The voltage regulator of claim 14, wherein the electronic device furnishes the indication in response to the output voltage being regulated substantially at the predetermined output voltage level.

17. The voltage regulator of claim 14, wherein the indication represents a voltage identification number and the electronic device comprises a central processing unit.

18. The voltage regulator of claim 14, wherein the circuit validates the indication by comparing the indication to an initialization value for the indication.

* * * * *